March 27, 1956     J. G. LIVINGSTONE     2,739,740
POURING SPOUT
Filed Jan. 28, 1952     2 Sheets-Sheet 1
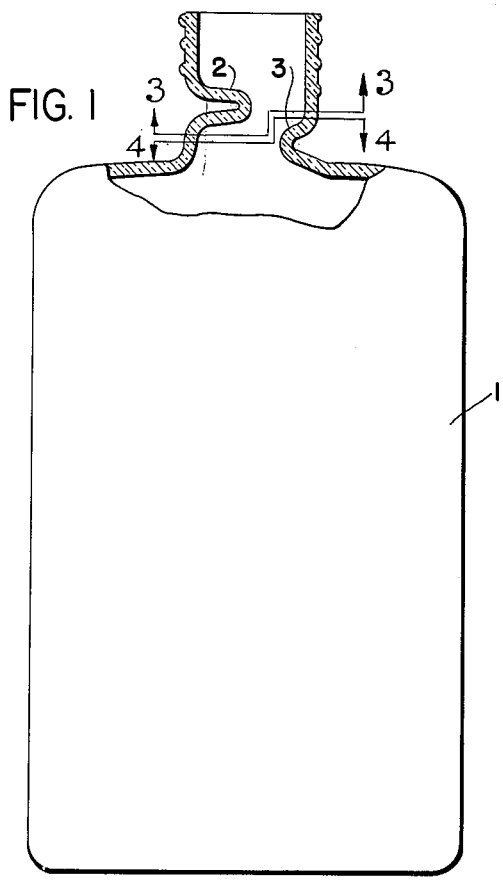
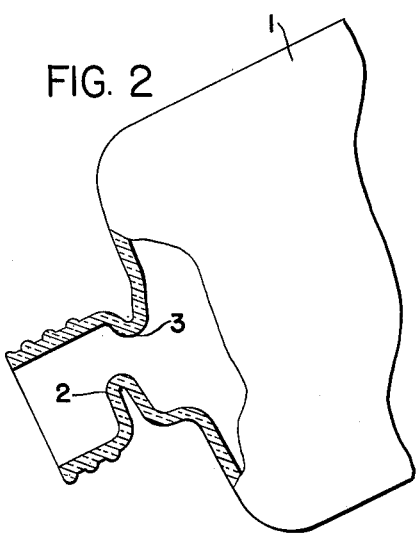
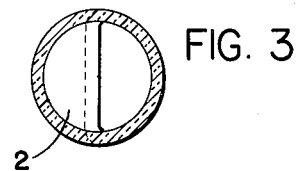
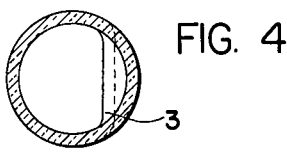
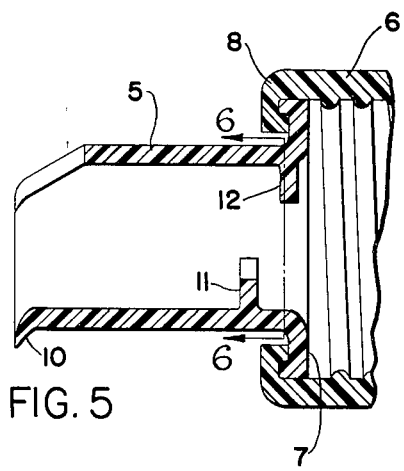
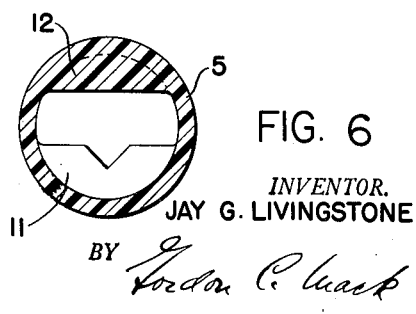
INVENTOR.
JAY G. LIVINGSTONE
BY
ATTORNEY March 27, 1956  J. G. LIVINGSTONE  2,739,740
POURING SPOUT Filed Jan. 28, 1952  2 Sheets-Sheet 2

*INVENTOR.*
JAY G. LIVINGSTONE
BY

ATTORNEY ers for drinks, etc. Such bottles vary from substantially three to thirty-two ounces, in size. The diameter of the spout, whether on a bottle or an adapter, will be substantially eight to thirty millimeters.

United States Patent Office 2,739,740
Patented Mar. 27, 1956

2,739,740
POURING SPOUT

Jay G. Livingstone, Akron, Ohio

Application January 28, 1952, Serial No. 268,604

7 Claims. (Cl. 222—420)

This invention relates to a pouring spout on a bottle or the like, provided with a baffle on opposite sides of the inner surface of the spout. The object of the baffles is to restrict the delivery of liquid from the spout to dropwise flow.

The spout of this invention may be on a bottle or an adapter. The invention is applicable only to relatively small bottles such as are used for medicines, chemical reagents, flavoring material (e. g. bitters) for drinks, etc. Such bottles vary from substantially three to thirty-two ounces, in size. The diameter of the spout, whether on a bottle or an adapter, will be substantially eight to thirty millimeters.

In order that liquid may flow from a bottle, or from an adapter affixed to a bottle, air must enter to replace the displaced liquid. The baffles of this invention obstruct the flow of liquid and air, and no more than a few drops of liquid are released from the vessel. These may be the size of ordinary drops or larger. There is no continuous flow of liquid from the bottle or adapter when poured under and over the baffles.

The baffles will be located away from the mouth of the spout, and ordinarily will be in the bottom half of the spout, one of the baffles being substantially at the base of the spout. They may be spaced different distances from the mouth of the spout, and, in that case, ordinarily the baffle nearest the mouth will be located at the bottom of the spout during pouring.

The size of the baffles will vary. Each baffle must be of substantial size and the area of the two will total over fifty per cent of the cross-sectional area of the spout. The respective sizes of the baffles will vary depending upon the predetermined use which may require only one small drop or a larger drop or several drops.

The invention will be further described in connection with the accompanying drawings, in which—

Fig. 1 is a side view, partly in section, of a bottle provided with two baffles in the neck;
Fig. 2 is a section through the upper part of the bottle in a pouring position;
Fig. 3 is a section on the line 3—3 of Fig. 1;
Fig. 4 is a section on the line 4—4 of Fig. 1;
Fig. 5 is a longitudinal section through an adapter, the spout of which is provided with two baffles;
Fig. 6 is a section on the line 6—6 of Fig. 5; and
Figs. 7–20 are diagrammatic views of various baffle arrangements in an adapter.

The neck of the bottle 1, is provided with a wider baffle 2, and a narrower baffle 3. Both baffles may be of the same width or either one may be wider than the other. They are placed rather closely adjacent one another on opposite sides of the inner surface of the neck of the bottle, near the base of the neck, but they do not overlap. They are formed by pressing the neck in while the substance of which the bottle is made is still deformable, whether it be glass or organic plastic. When the bottle is tilted for pouring either the wider or narrower baffle may be on the bottom. Care is taken to have one of the baffles on the bottom and the other on the top. The outside configuration of the bottle may be such as to facilitate this. For example, the bottle may be provided with a depression or a lug, etc. against which the user is to place his thumb.

In using, the bottle is tilted until the inner surface of each baffle is covered with liquid. The baffles prevent the entrance of air and the only liquid which leaves the bottle is the few drops which leave the bottle as it is tilted to pouring position.

Although no liquid pours from the bottle after the first few drops escape, the passageway through the neck is large enough to permit the introduction of a hose or the like, through which the bottle may be quickly filled.

Figure 6 shows an adapter 5 which is adapted to be fastened over the end of a bottle by the screw cap 6 which is internally threaded and is screwed onto threads on the outside of the bottle neck. The flange 7 on the cap cooperates with flange 8 on the adapter to hold the adapter on the end of the bottle.

The spout is provided with the lip 10 which is always located at the bottom side of the spout when liquid is poured through the spout. This locates the baffle 11 on the bottom of the spout and the baffle 12 on the top of the spout.

The diameter of the spout, whether in an adapter or bottle, may vary. The larger the diameter the wider the baffles. As one specific example of a device, reference is had to an adapter such as that shown in Fig. 5 having a spout with an internal diameter of .542 inch. The baffle 12, located at the base of the bottle neck, is .156 inch wide and .050 inch thick, and the baffle 11 is .208 inch wide and .062 inch thick. The former covers substantially twenty per cent of the cross-sectional area of the inside of the spout, and the latter covers substantially fifty per cent. The bottom side of the baffle 11 is spaced .190 inch from the top side of the baffle 12. There is a right angled notch 13 in baffle 11. This notch is .093 inch deep and .125 inch wide. In this spout the distance between the bottom edge of the baffle 12 and the top edge of the baffle 11 when the spout is horizontal, as shown in Figs. 5 and 6, is .210 inch. A bottle provided with an adapter as specifically described, when filled with water and inverted, pours a single drop from the full bottle. If the bottle is only one-third full or less, it pours two drops. These drops are larger than the drop which drips from the lip after the bottle has been emptied. After releasing the drop or drops, there is no more flow of liquid from the bottle unless it is turned upright, and then again inverted. The flow will then be substantially as before.

The effect of two baffles is illustrated in Figs. 7 to 20. The adapter illustrated is of the same general nature as the adapter shown in Figs. 5 and 6 except that the arrangement of the baffles is different. The figures are diagrammatic. In each pair, the figure on the left illustrates a cross section through the adapter shown at the right. In Figs. 7 and 8 there is a single baffle. This baffle is at the top of the spout of the adapter when in the pouring position, and its width at the center of the spout as shown, is about one-fifth of the diameter of the spout. Pouring water from a bottle equipped with this adapter, a continuous stream of the water issues from the adapter without surging, regardless of how full the bottle is, just so long as the depth of water in the spout covers the bottom of the baffle.

Figures 9 and 10 show an adapter with a somewhat wider baffle which covers about half the cross-sectional area of the spout. When a bottle provided with this adapter is tipped to the pouring position it emits a volume equal to several large drops from a full bottle, and gushes from a half-filled bottle. It pours a smooth stream when the bottle is one-quarter or less full.

Figures 11 and 12 show an adapter with two baffles, and when this is used on a bottle, but a single drop is poured from the bottle, whether the bottle be full or almost empty.

Figures 13 and 14 show another arrangement of two baffles. When this adapter is used on a full bottle a single drop of water issues from the bottle. When the bottle is one-quarter full or less several drops issue from the bottle each time it is tipped to pouring position.

Figure 7:
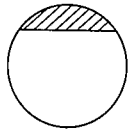
Figure 8:
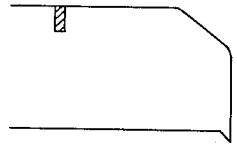
Figure 9:
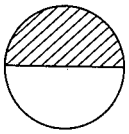
Figure 10:
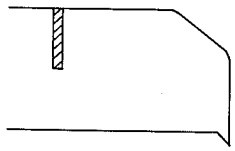
Figure 11:
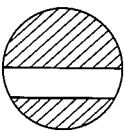
Figure 12:
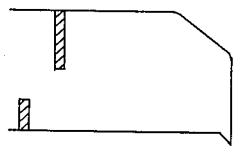
Figure 13:
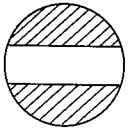
Figure 14:
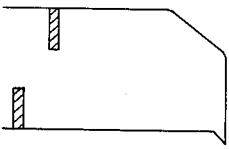
Figure 15:
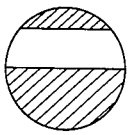
Figures 15 and 16 show a still different arrangement of two baffles. Using an adapter with these baffles, one large drop of water issues from the bottle whether full or nearly empty.
Figure 16:
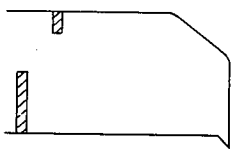
Figure 17:
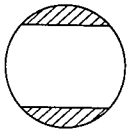
Figures 17 and 18 show two narrow baffles, the area of which does not equal one-half the cross-sectional area of the spout. When water is poured through this adapter a steady stream issues from the adapter without gushing.
Figure 18:
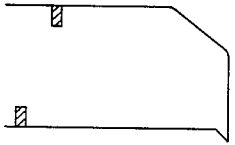
Figure 19:
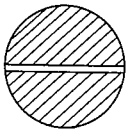
Figures 19 and 20 show two baffles, the area of which nearly equals the cross-sectional area of the adapter. When this adapter is used on a bottle, whether the bottle be full or nearly empty, but a single drop issues from the bottle when tipped to the pouring position.
Figure 20:
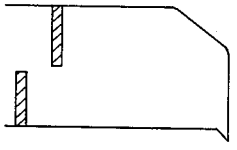

The amount poured dropwise from such a bottle depends upon the distance between the baffles as measured along the neck of the bottle or spout and also the vertical distance between the two baffles when the spout is held horizontally. The greater the distance between the baffles the more the liquid which is released when the bottle is inverted. If the spout is turned ninety degrees on its horizontal axis so that the baffles are at the sides of the spout instead of at the top and bottom, the flow is no longer dropwise.

What I claim is:

1. In a bottle or the like, a substantially straight pouring spout eight to thirty millimeters in diameter and having two baffles therein which reduce the cross-sectional area of the passageway through the spout, one rising from the bottom of the inner surface of the neck when the bottle is in a pouring position and one extending downwardly from the inner surface of the neck when in said pouring position, there being an opening between the two baffles, whereby when the bottle is full and inverted the flow of liquid therefrom is drop-wise and not a stream.

2. An adapter for a bottle or the like, with a substantially straight spout having a pouring lip and a baffle with a substantially straight lower edge extending downwardly from the inner surface of the spout at substantially the base thereof, and opposite the lip, and a somewhat wider baffle extending upwardly from the opposite side of the inner surface of the spout and nearer the lip, the top edge of the latter baffle being notched at the middle, said baffles reducing the cross-sectional area of the passageway through the adapter, whereby when the vessel with the adapter attached is inverted when full of water, the flow of liquid from the spout is drop-wise and not a stream, and quickly stops while the bottle is substantially full.

3. A vessel with a single opening which opening is located at the end of a neck on the vessel, restrictions extending inwardly from opposite sides of the neck which reduce the cross-sectional area of the opening through the neck, one of which restrictions obstructs the free flow of air into the vessel and the other of which restrictions reduces the outward flow of the liquid over that side of the neck from which it extends, whereby there is only dropwise flow through the neck when the vessel is tipped for pouring over said side, but with the neck rotated through 90 degrees said restrictions permit constant flow of liquid outwardly through the neck with constant flow of air to the vessel above the liquid.

4. The vessel of claim 3 in which the restrictions are indented at the central portions thereof and permit a larger volume of liquid to flow through the central portion of the opening than toward the top and bottom thereof when the neck is rotated through 90 degrees, as stated in claim 3.

5. An adapter for an opening in a vessel, which adapter is formed with a passageway therethrough and restrictions which are adapted to extend inwardly from opposite sides of the opening when the adapter is fitted to the vessel, which restrictions reduce the cross-sectional area of the passageway through the adapter, one of which restrictions obstructs the free flow of air into the adapter and the other of which restrictions reduces the outward flow of liquid so that no more than a few drops of liquid are released from the vessel when the vessel to which the adapter is fitted contains liquid and has but a single opening and is tipped for pouring over one of said restrictions, but with the adapter rotated through 90 degrees said restrictions permit constant flow of liquid outwardly through the adapter with constant inward flow of air over the liquid.

6. The adapter of claim 5 in which the restrictions are indented at the central portions thereof and permit a larger volume of liquid to flow outwardly through the central portion of the adapter when rotated through 90 degrees, as stated in claim 5, than through the portions of the adapter above and below said central portion.

7. A vessel with a single opening which opening is located at the end of a neck on the vessel, said end of the neck being adapted for dispensing liquid equally well in all directions, restrictions extending inwardly from opposite sides of the opening which reduce the cross-sectional area of the opening through the neck, one of which restrictions obstructs the free flow of air into the vessel and the other of which restrictions reduces the outward flow of the liquid over that side of the neck from which it extends, whereby there is only dropwise flow through the neck when the vessel is tipped for pouring over said side, but with the vessel rotated through ninety degrees said restrictions permit constant flow of liquid outwardly through the neck with constant flow of air to the vessel above the liquid.

References Cited in the file of this patent

UNITED STATES PATENTS

| | | |
|---|---|---|
| 1,283,384 | Weil | Oct. 29, 1918 |
| 1,316,106 | Peters | Sept. 16, 1919 |
| 1,841,980 | Plattring | Jan. 19, 1932 |
| 2,228,048 | Brune | Jan. 7, 1941 |
| 2,350,596 | Douglass | June 6, 1944 |
| 2,601,039 | Livingstone | June 17, 1952 |
| 2,601,040 | Livingstone | June 17, 1952 |